(12) United States Patent
Hwang et al.

(10) Patent No.: US 7,312,838 B2
(45) Date of Patent: Dec. 25, 2007

(54) LIQUID CRYSTAL DISPLAY DEVICE COMPRISING A PROTECTING UNIT FOR ENCLOSING A FASTENER AND HOLDING LAMP WIRES

(75) Inventors: Jae Ho Hwang, Gyeongsangbuk-Do (KR); Ki Won Kim, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 265 days.

(21) Appl. No.: 11/138,695

(22) Filed: May 27, 2005

(65) Prior Publication Data

US 2005/0264714 A1 Dec. 1, 2005

(30) Foreign Application Priority Data

May 29, 2004 (KR) .............. 10-2004-0038681

(51) Int. Cl.
*G02F 1/1333* (2006.01)
(52) U.S. Cl. .............. 349/58; 349/60; 349/65; 362/634
(58) Field of Classification Search .......... 349/58, 349/60, 65, 63; 362/611, 615, 632–634
See application file for complete search history.

(56) References Cited

U.S. PATENT DOCUMENTS

| 6,339,418 | B1 * | 1/2002 | Kitagawa | 345/102 |
| 6,456,343 | B2 * | 9/2002 | Kim et al. | 349/58 |
| 6,910,784 | B2 * | 6/2005 | Ito | 362/632 |
| 6,960,001 | B2 * | 11/2005 | Nitto et al. | 362/218 |

* cited by examiner

*Primary Examiner*—Thoi V. Duong
(74) *Attorney, Agent, or Firm*—McKenna, Long & Aldridge LLP

(57) ABSTRACT

Disclosed is a liquid crystal display device that mitigates performance degradation problems, which result from assembling and fastening the covers of the liquid crystal display device. By incorporating a protecting unit that substantially isolates fastening screws from the inner volume between the upper and lower covers of the liquid crystal display device, impurities introduced by friction between the fastening screws and the covers are contained, preventing them from contamination driver circuitry in the liquid crystal display device. Further, the protecting unit holds the lamp wires for the backlight of the liquid crystal display device, preventing the fastening screws from contacting the lamp wires and potentially exposing the inner wire, which may lead to instability in the backlight supply voltage.

19 Claims, 3 Drawing Sheets

LIQUID CRYSTAL DISPLAY DEVICE COMPRISING A PROTECTING UNIT FOR ENCLOSING A FASTENER AND HOLDING LAMP WIRES

This application claims the benefit of Korean Patent Application No. 2004-38681, filed May 29, 2004, which is hereby incorporated by reference for all purposes as if fully set forth herein.

BACKGROUND OF THE INVENTION

1. Field of the Invention

The present invention relates to liquid crystal display device, and more particularly, to a liquid crystal display device, which prevents driving circuit malfunction by preventing the introduction of impurities generated by friction induced by a screw coupling the liquid crystal display device, and by preventing damage to an inner wire caused by the screw.

2. Description of the Related Art

High quality visual display of electronic information has become crucial in the global information-based economy. Demand has increased for displays that have low power consumption characteristic, that are thin and light, and that have high picture quality. To meet this demand, liquid crystal display devices have been developed that have the advantages of sharp image quality, low power consumption, and are thin and light compared to other displays.

The structure of a related art liquid crystal display device is described below. The liquid crystal display device includes a liquid crystal display panel formed by bonding a thin film transistor array substrate and a color filter substrate with a predetermined cell gap between them, and disposing a liquid crystal layer between the bonded thin film transistor array substrate and color filter substrate. The liquid crystal display device further includes a driving unit for driving the liquid crystal display panel and a backlight unit for emitting light to the liquid crystal display panel.

The thin film transistor array substrate includes a plurality of gate lines and a plurality of data lines that define a plurality of regions, which are arranged vertically and horizontally on the substrate, defining a plurality of pixels. These pixels are arranged in a matrix fashion on the thin film transistor array substrate.

At the color filter substrate, red, green and blue color filter layers are formed corresponding to each pixel, and a black matrix surrounding the peripheries of the color filter layers is formed to prevent leakage of light from the color filter layers and prevent color interference of light passing through the pixels.

A common electrode and a pixel electrode are respectively formed on the color filter substrate and the thin film transistor array substrate, which apply an electric field to the liquid crystal layer by a voltage difference between the two electrodes. A pixel electrode is provided in each pixel, which enables display of an image by controlling the light transmittance of each individual pixel.

Accordingly, a liquid crystal display device displays an image by controlling the amount of light passing through the liquid crystal layer. Light is generally provided by a backlight unit disposed adjacent to the liquid crystal display panel. The backlight unit includes a lamp for emitting light and an inverter for supplying power to the lamp. The lamp is arranged on the side or rear of the liquid crystal display panel.

Liquid crystal display devices have been developed with panels having different surface areas according to purpose and place of use. For example, small liquid crystal displays have been developed for applications including small home appliances, navigation devices, and digital video displays. Despite the small size, the liquid crystal display panel provided therein is designed to have as large surface area as possible. In such applications, the distance between the periphery of the liquid crystal display device and the edge of the liquid crystal display panel becomes considerably smaller and thus, the space becomes narrower. This configuration is referred to as a narrow bezel design.

Further, to reduce the thickness of a small liquid crystal display device, an edge type backlight unit is used, which supplies light to a liquid crystal display panel by arranging a lamp on the side of the liquid crystal display panel. U-shaped or L-shaped lamps are common examples. Such an edge type backlight unit is described below.

FIG. 1 illustrates a related art edge type backlight unit. Referring to FIG. 1, the edge type backlight unit includes a L-shaped lamp 20 bent along the periphery of a liquid crystal display panel, and a plurality of lamp wires 15 and 16 for supplying power applied through a connector 10 to opposite ends of the lamp 20.

A high voltage is needed to drive the lamp 20. Though not shown in the drawings, the liquid crystal display device includes an inverter for supplying high voltage to the lamp 20. The inverter converts an external direct current voltage into an alternating current of high voltage to supply it to the lamp 20. A voltage applied through the connector 10 is applied to the anode of the lamp 20 via the lamp wires 15 and 16. High voltage lamp wire 16 and low voltage lamp wire 15 are each arranged in a narrow space between the periphery of the liquid crystal display device and the liquid crystal display panel.

The arrangement of the lamp wires 15 and 16 and the structure of the liquid crystal display device as described below.

FIG. 2 is an exemplary view illustrating a cross section of the liquid crystal display device. Referring to FIG. 2, the liquid crystal display device includes a light guide plate 135 for uniformly dispersing light from a lamp (not shown) and supplying it to upper portion of the liquid crystal display device; a reflective plate 136 for reflecting the light irradiated onto a lower portion of the light guide plate 135 toward the upper portion; and an optical sheet 137 for concentrating and dispersing the light emitting through the light guide plate 135 and supplying it to upper portions. The liquid crystal display device further includes a liquid crystal display panel 130 for displaying an image by controlling the transmittance of light through the optical sheet 137; polarizing plates 132 attached to both surfaces of the liquid crystal display panel 130 for polarizing light; a bottom cover 140 provided under the reflective plate for protecting the reflective plate 136 and the light guide plate 135; a guide panel 145 for protecting the side of the bottom cover 140 and an upper portion of the light guide plate 135; and a top case 150 for pressing and fixing the liquid crystal display panel 130 provided on the light guide plate 135 and for coupling to the side of the guide panel 145.

The liquid crystal display panel 130 is formed by bonding a thin film transistor array substrate 130*b* and a color filter substrate 130*a*, with the polarizing plates 132 being disposed on both surfaces of the liquid crystal display panel 130.

The light guide plate 135, reflective plate 136 and optical sheet 137 are arranged within the space formed by coupling the guide panel 145 and the bottom cover 140. The light guide plate 135, reflective plate 136 and optical sheet 137 are sequentially laminated to supply light from the lamp evenly and stably to the entire surface of the liquid crystal display panel 130. Though not shown, the lamp is arranged on the side of the light guide plate 135, on the opposite side of a lamp wire 117 to supply light to the light guide plate 135.

The lamp wire 117 for supplying power to the lamp is arranged in the space between the bottom cover 140 and the light guide plate 135. However, there is no particular structure for preventing movement by fixing the lamp wire 117 in the space between the bottom cover 140 and the light guide plate 135. The top case 150, the guide panel 145, and the bottom cover are coupled into a single unit by a fastener, such as a screw.

FIG. 3 is an exemplary view illustrating the liquid crystal display device coupled by a screw. FIG. 3 is substantially similar to FIG. 2 except that a screw 260 is additionally shown. Referring to FIG. 3, a screw 260 passes through top case 150, guide panel 145, and bottom cover 140 through the side of the top case 150. The forward part of the screw 260 penetrates the space between the bottom cover 140 and the light guide plate 135. Accordingly, the top case 150, the guide panel 145 and the bottom cover 140 are fastened by screw 260.

However, liquid crystal display devices with a narrow bezel design have a considerably narrower space between the bottom cover 140 and the light guide plate 135 due to the fact that they have as large surface area of a liquid crystal display panel as possible. Therefore, the screw 260 passing through the top case 150, the guide panel 145 and the bottom cover 140 occupies a considerable area of the space between the bottom cover 140 and the light guide plate 135. Accordingly, a problem may occur where that a lamp wire 117 moving between the bottom cover 140 and the light guide plate 135 is damaged by the screw 260 coming through the bottom cover 140, and the coating of the lamp wire 117 is stripped, thereby exposing the interior wire. In this case, the exposed wire may make contact with the metal screw 260, thereby changing the voltage level supplied through the lamp wire 117. This changed voltage level may affect the amount of light emitted from the lamp, thereby degrading the picture quality of the liquid crystal display device.

Further, the screw 260 continuously causes friction with the top case 150, the guide panel 145 and the bottom cover 140 while passing through each of these components, which leads to the production of impurities caused by the friction. Since the top case 150, the guide panel 145, and the bottom cover 140 include pressed material made of metal, and the screw 260 is also made of metal, the impurities produced by the friction between them may cause degraded performance if they are introduced into a driving circuit for driving the liquid crystal display panel 131.

SUMMARY OF THE INVENTION

Accordingly, the present invention is directed to a liquid crystal display device that substantially obviates one or more of the aforementioned problems due to limitations and disadvantages of the related art. In general, the present invention achieves this by providing a protecting unit that isolates friction-induced impurities and prevents damage to lamp wires.

An advantage of the present invention is that it prevents image quality degradation resulting from fastener-induced impurities introduced by fasteners.

Another advantage of the present invention is that it prevents image quality degradation resulting from fastener-induced damage to lamp wires.

Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with a liquid crystal display device that comprises a liquid crystal display panel; a light guide plate disposed approximate to the liquid crystal display panel; a bottom cover disposed along a side portion of the light guide plate and along a peripheral portion of a lower surface of the light guide plate; a top cover disposed along a side portion of the liquid crystal display panel, wherein the first cover and the second cover are fastened together by a fastener; and a protecting unit substantially enveloping a portion of the fastener In another aspect of the present invention, the aforementioned and other advantages are achieved by a liquid crystal display device that comprises an optical member for concentrating and dispersing light from a lamp; a liquid crystal display panel for displaying an image by controlling the transmittance of light supplied through the optical member; a bottom cover for supporting a lower portion of the optical member; a guide panel coupled to the bottom cover and for fixing the optical member; a top case coupled to the side of the bottom cover; at least one fastener fastening the top case, bottom cover and guide panel; a wire disposed in a space between the bottom cover and the optical member and for supplying power to the lamp; and a protecting unit for enclosing the fastener exposed to a space between the bottom cover and the optical member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
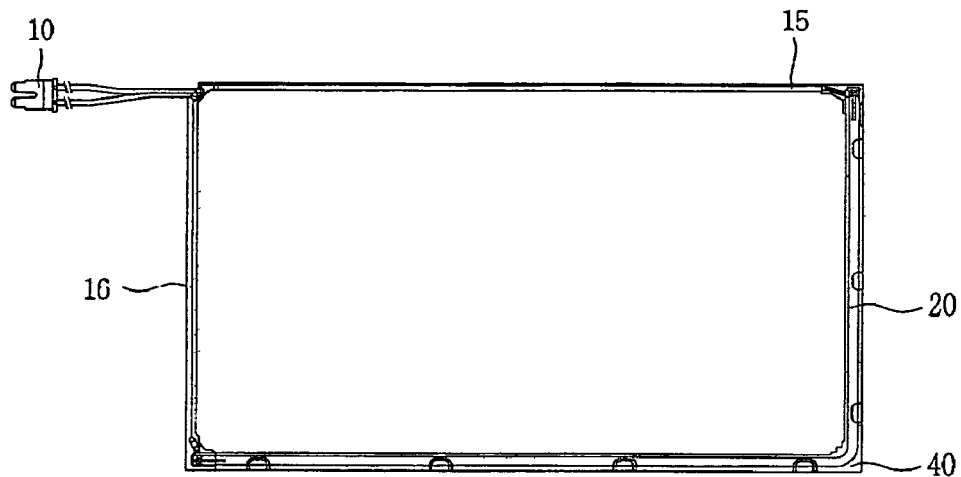
FIG. 1 illustrates an edge type backlight unit according to the related art.
Figure 2:
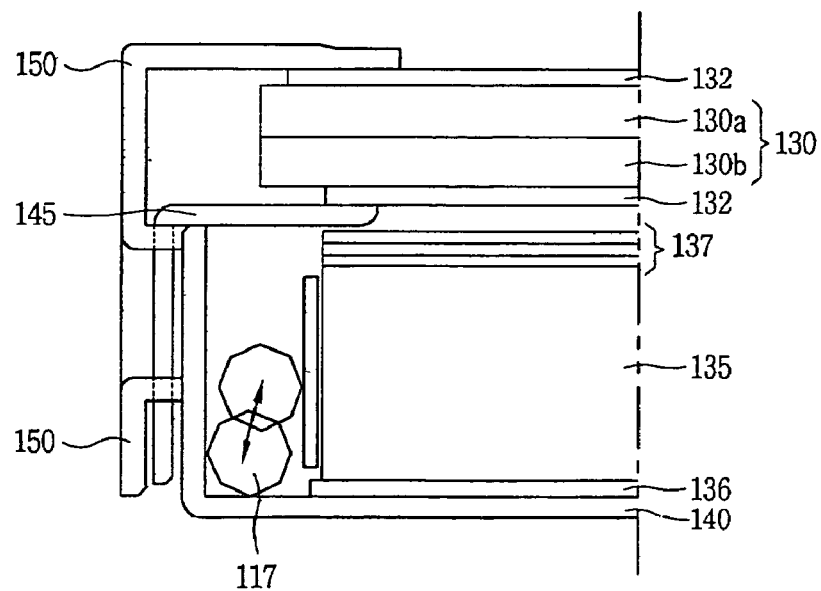
FIG. 2 illustrates a cross section of a liquid crystal display device according to the related art.
Figure 3:
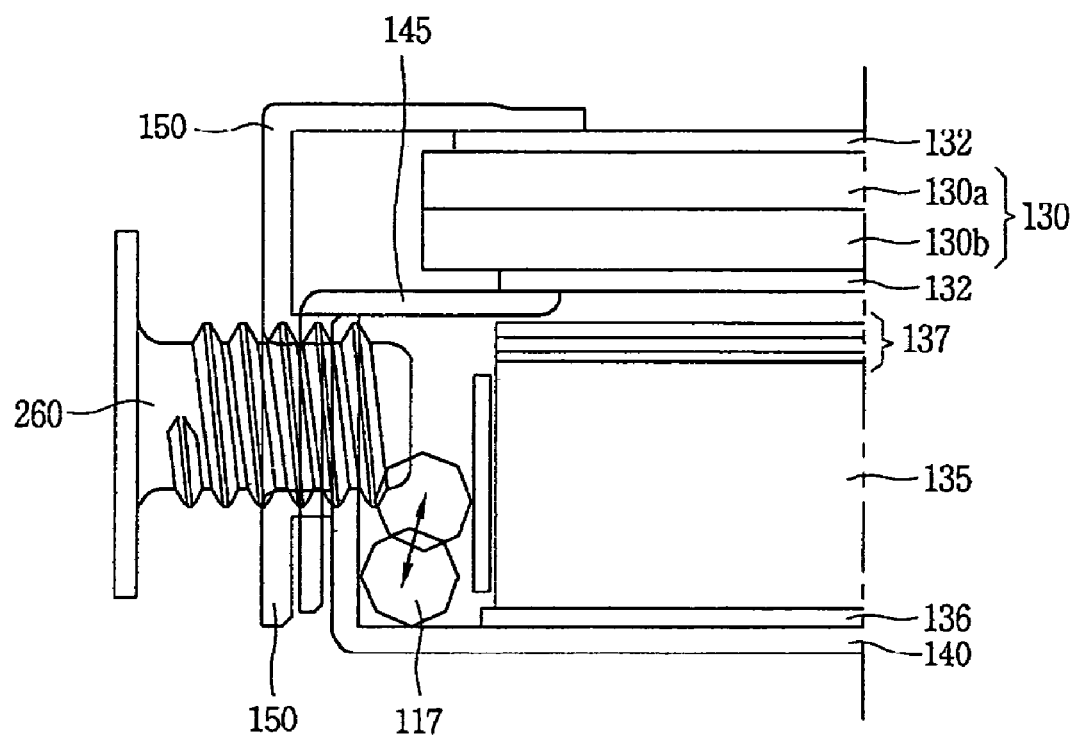
FIG. 3 is an exemplary view illustrating a structure in which the liquid crystal display device of FIG. 2 is coupled by a screw.
Figure 4:
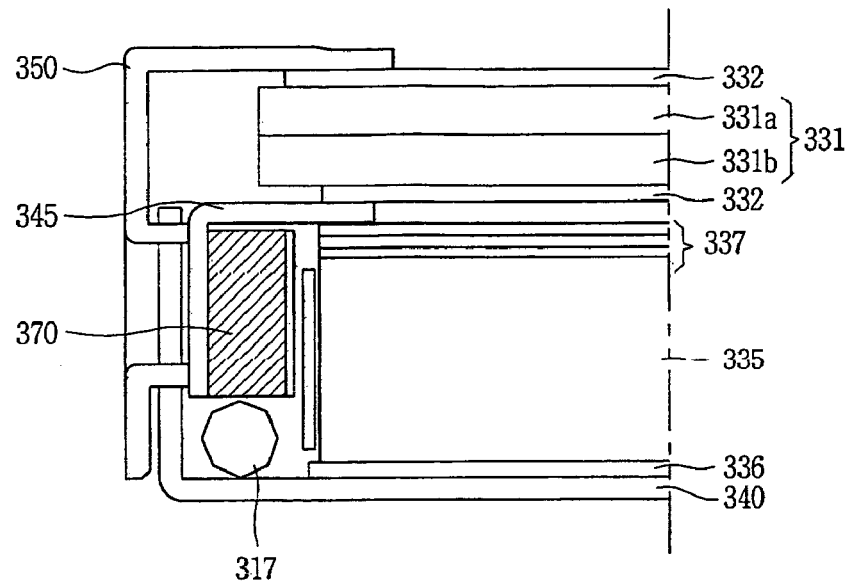
FIG. 4 illustrates an exemplary liquid crystal display device according to the present invention.

FIG. 4 illustrates a cross section of a liquid crystal display device according to the present invention. Referring to FIG.

4, the liquid crystal display device includes a light guide plate 335 for transmitting light emitted from a lamp to upper portions in one direction; a reflective plate 336 for reflecting the light irradiated to a lower portion of the light guide plate 335 toward an upper portion of the light guide plate 335; and an optical sheet 337 for concentrating and dispersing the light transmitted through the light guide plate 335 to the liquid crystal display panel 331. The liquid crystal display device further includes a plurality of polarizing plates 332 attached to both surfaces of the liquid crystal display panel 331 for polarizing light; a bottom cover 340 for supporting a lower portion of the reflective plate 336; a guide panel 345 contacted with the side of the bottom cover 340 and for supporting the liquid crystal display panel 331; a top case 350 contacted with the side of the bottom cover 340 and for pressing and fixing the liquid crystal display panel 331 from above. The liquid crystal display device also includes a wire 317 for supplying power to the lamp and a protecting unit 370 attached to the guide panel 345 and for pressing and fixing the lamp wire 317.

The liquid crystal display panel 331 is formed by bonding a first substrate 331a and a second substrate 331b, which are substantially parallel, at a predetermined cell gap and injecting a liquid crystal between the substrates. The liquid crystal forms a liquid crystal layer between the first and second substrates 331a and 331b, and is arranged according to the strength of an electric field formed between the first substrate 331a and the second substrate 331b. The electric field is provided by a voltage supplied by a driving circuit (not shown). The electric field controls the alignment of the liquid crystal, thereby controlling the transmittance of light from the lamp supplied through the optical sheet 337 and thus representing an image by a plurality of pixels.

The lamp is provided at the side of the light guide plate 335, and light emitted from the lamp is supplied to the side of the light guide plate 335. The light guide plate 335 transmits the received light evenly to the entire surface of the liquid crystal display panel 331. Some part of the light from the lamp is irradiated to a lower portion of the light guide plate 335. To prevent loss of the light, the light irradiated onto a lower portion of the light guide plate 335 is reflected by the reflective plate 336 toward the light to the liquid crystal display panel 331 side of the light guide plate 335.

The optical sheet 337 is provided on top of the light guide plate 335, and functions to concentrate diffused light, disperse it and transmits it evenly to the entire surface of the liquid crystal display panel 331. Polarizing plates 332 are attached to both surfaces of the liquid crystal display panel 331 to polarize the light.

The bottom cover 340 having a bent L-shape under the reflective plate 336 protects the reflective plate 336, and supports the reflective plate 336, light guide plate 335 and optical sheet 337 from below. The lamp wire 317 for supplying power to the lamp is provided in the space formed between the side of the bottom cover 340 and the side of the light guide plate 335.

One surface of the guide panel 345 that is bent in an L-shape is contacted to the side of the bottom cover 340 facing the side of the light guide plate 335, and another surface of the guide panel 345 presses against a peripheral area of the top of the optical sheet 337 to fix the optical sheet 337 between the light guide plate 335 and the guide panel 345, thereby preventing movement of the optical sheet 337.

The liquid crystal display panel 331 is positioned above, and is supported by the guide panel 345. One surface of the top case 350 of a L-shape is coupled to the side of the bottom cover 340, and another surface thereof presses against a peripheral area of the liquid crystal display panel 331 to press the liquid crystal display panel 331 between the guide panel 345 and the top case 350, thereby preventing movement of the liquid crystal display panel 331.

The protecting unit 370 is provided in the space between the light guide plate 335 and the bottom cover 340 and is attached to the inner surface of the bent guide panel 345. The protecting unit 370 is made of a flexible adhesive material having elasticity. This makes it deformable under external stresses such that it is easily restored to its original shape if external stresses are eliminated. Examples of such a flexible adhesive material include a foam tape.

As illustrated in FIG. 4, if the guide panel 345 with the protecting unit 370 attached thereto is contacted to the side of the bottom cover 340, the space formed between the guide panel 345 and the light guide plate 335 may be substantially filled by the protecting unit 370. Accordingly, when the lamp wire 317 is arranged in the space between the light guide plate 335 and the bottom cover 340 and the guide panel 370 is contacted to the side of the bottom cover 340, the lamp wire 317 may be substantially pressed and fixed to the bottom cover 340 by the protecting unit 370. That is, as the protecting unit 370 fills the space between the light guide plate 335 and the bottom cover 340, the lamp wire 337 is closely contacted between the protecting unit 370 and the bottom cover 340, thereby substantially preventing movement of the lamp wire 337.

Figure 5:
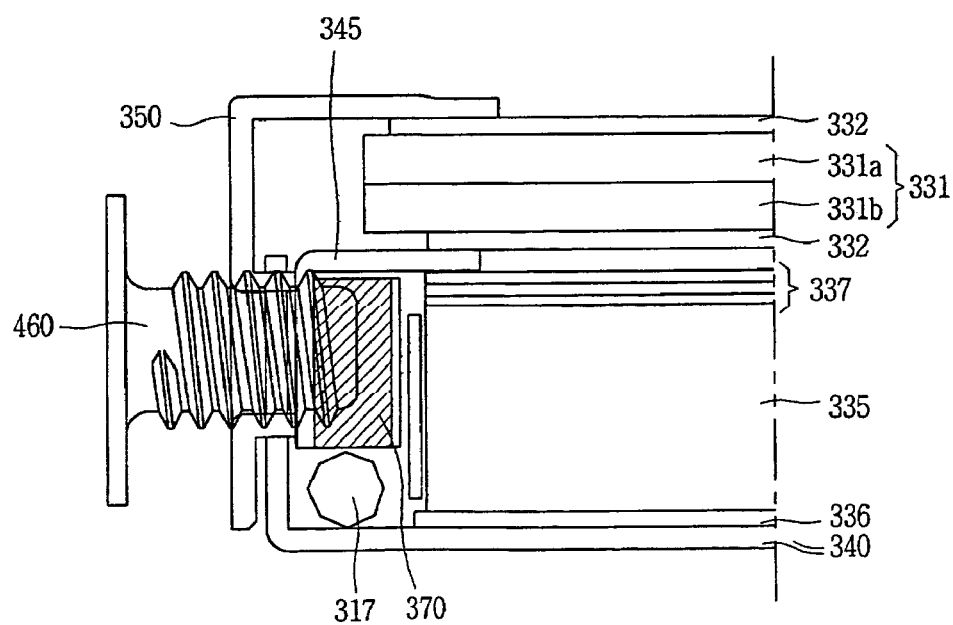
FIG. 5 illustrates a cross section of the liquid crystal display device to which a screw is fastened.

FIG. 5 illustrates a cross section of the liquid crystal display device to which a screw is fastened in FIG. 4. FIG. 5 is substantially similar to FIG. 4 but with the addition of screw 460.

As stated regarding FIG. 4, a protecting unit 370 restricts a space where a lamp wire 317 is located to the space between a bottom cover 340 and the protecting unit 370, thereby minimizing motion of the lamp wire 317. In a particular embodiment, the vertical dimension of the protecting unit 370 is made large enough to closely contact the lamp wire 317 completely between the protecting unit 370 and the bottom cover 340.

The protecting unit 370 spatially separates the screw 460 and the lamp wire 317 by positioning the lamp wire 317 in a restricted space and substantially filling the space into which the screw 460 will penetrate through the side of the top case 350. Therefore, damage to the lamp wire 317 by the screw 460 is mitigated.

Further, because the protecting unit 370 substantially fills the space between the light guide plate 335 and the bottom cover 340 which the screw 460 will penetrate, a portion of the screw 460 passing through the guide panel 345 is enclosed by the protecting unit 370. Because the protecting unit 370 includes an elastic material, its surface is deformed in the shape of the screw exposed to the space between the bottom cover 340 and the light guide plate 335, thereby completely enclosing or enveloping some part of the exposed screw 460 within the protecting unit 370. Accordingly, the impurities formed while the screw 460 is passing through the guide panel 345 and the bottom cover 340 are attached to the surface of the protecting unit 370 and are isolated from outside, thereby preventing the impurities from being introduced into the liquid crystal display device.

As above, for the protecting unit 370 to completely enclose part of the screw 460 penetrating through the guide panel 345 and isolate it from the outside, the area of the protecting unit 370 must be larger than that of the part of the screw 446 exposed from the guide panel 345. In other words, the area of the surface of the protecting unit 370 that is substantially perpendicular to the axis of the screw 460 must be greater than the area of the screw 460 that penetrates the protecting unit 370.

As described above, the liquid crystal display device according to the present invention can prevent picture quality degradation caused by impurities by preventing the impurities from being introduced upon fastening the covers of the liquid crystal display device. Impurities can be mitigated according to the present invention by enclosing some part of a screw 460 penetrating into the liquid crystal display device with a protecting unit upon fastening the liquid crystal display device by the screw 460.

Further, picture quality degradation resulting from lamp power supply instabilities can be substantially mitigated by preventing damage of a lamp wire 317 caused by the screw 460. By spatially isolating a part of the screw 460, which penetrates the liquid crystal display device and exposed to the internal space of the liquid crystal display device, the protecting unit 370 may prevent the screw 460 from contacting the lamp wire 317.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
   a liquid crystal display panel;
   a light guide plate disposed approximate to the liquid crystal display panel for guiding the light from a lamp to the liquid crystal display panel;
   a bottom cover disposed along a side portion of the light guide plate and along a peripheral portion of a lower surface of the light guide plate;
   a top cover disposed along a side portion of the liquid crystal display panel, wherein the bottom cover and the top cover are fastened together by at least a fastener; and
   a protecting unit substantially enveloping a portion of the fastener,
   wherein a space is generated between the bottom cover, the light guide plate, and the protecting unit to dispose a wire supplying the power to the lamp.

2. The liquid crystal display device of claim 1, wherein the fastener is a screw.

3. The liquid crystal display device of claim 1, further comprising a guide panel disposed along the side portion of the light guide plate, wherein the guide panel is fastened together with the top cover and the bottom cover by the fastener.

4. The liquid crystal display device of claim 3, wherein the protecting unit is attached to a surface of the guide panel.

5. The liquid crystal display device of claim 3, wherein the guide panel is disposed between the light guide plate and the bottom cover.

6. The liquid crystal display device of claim 3, wherein the guide panel includes an L-shape, wherein a portion of the L-shape is disposed between the light guide plate and the liquid crystal display panel.

7. The liquid crystal display device of claim 1, wherein the top cover includes an L-shape, wherein a portion of the L-shape is adjacent to a peripheral area of an upper surface of the liquid crystal display panel.

8. The liquid crystal display device of claim 1, wherein the bottom cover includes an L-shape, wherein a portion of the L-shape is disposed parallel and approximate to a lower surface of the light guide plate.

9. The liquid crystal display device of claim 1, further comprising a reflective plate disposed between the light guide plate and the bottom cover.

10. The liquid crystal display device of claim 1, wherein the protecting unit comprises a flexible adhesive material having elasticity.

11. The liquid crystal display device of claim 1, wherein the protecting unit comprises a foam tape.

12. The liquid crystal display device of claim 1, wherein the wire is in contact with the protecting unit and the bottom cover.

13. The liquid crystal display device of claim 1, further comprising an optical sheet disposed between the light guide plate and the liquid crystal display panel.

14. The liquid crystal display device of claim 1, further comprising a polarizer disposed between the liquid crystal display panel and the light guide plate.

15. A liquid crystal display device, comprising:
    an optical member for concentrating and dispersing light from a lamp;
    a liquid crystal display panel for displaying an image by controlling the transmittance of light supplied through the optical member;
    a bottom cover for supporting a lower portion of the optical member;
    a guide panel coupled to the bottom cover and for fixing the optical member;
    a top case coupled to a side of the bottom cover;
    at least one fastener fastening the top case, bottom cover and guide panel;
    a protecting unit for enclosing the fastener exposed to a space between the bottom cover and the optical member; and
    a wire disposed in a space caused by the bottom cover, the optical member, and the protecting unit to supply power to the lamp.

16. The device of claim 15, wherein the fastening means is a screw.

17. The device of claim 15, wherein the protecting unit includes a foam tape.

18. The device of claim 15, wherein the protecting unit is attached to the guide panel.

19. The device of claim 15, wherein a first surface of the guide panel is coupled to a side of the bottom cover, and a second surface of the guide panel presses against a top of the optical member.

* * * * *